United States Patent
Miller

(10) Patent No.: US 7,946,397 B2
(45) Date of Patent: May 24, 2011

(54) DISC BRAKE WITH A SELF-ENERGIZING ELECTRIC MOTOR ACTUATOR

(75) Inventor: Bernhard Miller, Weil der Stadt (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/104,636

(22) Filed: Apr. 17, 2008

(65) Prior Publication Data

US 2008/0257660 A1 Oct. 23, 2008

Related U.S. Application Data

(63) Continuation of application No. PCT/EP2006/009989, filed on Oct. 17, 2006.

(30) Foreign Application Priority Data

Oct. 18, 2005 (DE) .......................... 10 2005 049 786

(51) Int. Cl.
F16D 55/14 (2006.01)

(52) U.S. Cl. ...................... 188/72.2; 188/72.1; 188/72.7; 188/70 B; 188/70 R; 188/106 P

(58) Field of Classification Search ................. 188/72.2, 188/70 B, 72.1, 72.7, 70 R, 106 P
See application file for complete search history.

(56) References Cited

U.S. PATENT DOCUMENTS

| 2,876,625 | A | * | 3/1959 | Schnell | ............................ 60/545 |
| 2,976,956 | A | * | 3/1961 | Behles | ........................... 188/71.8 |
| 3,236,336 | A | | 2/1966 | Harrison | |
| 3,259,214 | A | * | 7/1966 | Lepelletier | .................... 188/346 |
| 3,948,571 | A | * | 4/1976 | Hefter et al. | ................. 303/22.7 |
| 4,435,021 | A | | 3/1984 | Hoenick | |
| 4,572,335 | A | * | 2/1986 | Kobelt | .......................... 188/72.1 |
| 4,602,702 | A | * | 7/1986 | Ohta et al. | .................... 188/72.1 |
| 6,328,388 | B1 | * | 12/2001 | Mohr et al. | ...................... 303/10 |
| 6,615,955 | B2 | * | 9/2003 | Jakovljevic | ................ 188/24.14 |
| 6,623,087 | B1 | * | 9/2003 | Wolff | .............................. 303/10 |
| 6,692,087 | B1 | * | 2/2004 | Wolff | .............................. 303/10 |
| 6,926,126 | B2 | | 8/2005 | Baumann et al. | |
| 7,172,056 | B2 | | 2/2007 | Baumann et al. | |
| 7,311,180 | B2 | | 12/2007 | Baumann et al. | |

(Continued)

FOREIGN PATENT DOCUMENTS

DE 195 27 936 A1 1/1997

(Continued)

OTHER PUBLICATIONS

International Search Report dated Mar. 15, 2007 including English translation (Ten (10) pages).

(Continued)

*Primary Examiner* — Bradley T King
*Assistant Examiner* — Mahbubur Rashid
(74) *Attorney, Agent, or Firm* — Crowell & Moring LLP

(57) ABSTRACT

A disc brake is provided with an actuator acting on a brake application device, which brake application device is used for applying at least one brake pad to a brake disc. The brake application device has a brake-internal hydraulic arrangement and is configured in a self-energizing mode. The brake pad is supported on the brake application device at a wedge angle and the wedge angle of the brake pad is adjusted by the hydraulic arrangement of the brake application device.

8 Claims, 3 Drawing Sheets

U.S. PATENT DOCUMENTS

| | | |
|---|---|---|
| 7,364,021 B2 | 4/2008 | Baumann et al. |
| 2004/0026183 A1 | 2/2004 | Trinh |
| 2005/0109566 A1 | 5/2005 | Baumann et al. |
| 2005/0126864 A1 | 6/2005 | Boisseau |
| 2005/0145449 A1* | 7/2005 | Jelley et al. .................. 188/72.7 |

FOREIGN PATENT DOCUMENTS

| | | |
|---|---|---|
| DE | 299 01 831 U1 | 6/1999 |
| DE | 198 02 386 A1 | 8/1999 |
| DE | 198 43 178 C1 | 3/2000 |
| DE | 101 05 540 A1 | 8/2002 |
| DE | 101 05 752 A1 | 9/2002 |
| DE | 103 24 424 A1 | 12/2004 |
| DE | 103 47 792 A1 | 5/2005 |
| DE | 103 47 942 A1 | 5/2005 |
| WO | WO 02/25137 A2 | 3/2002 |

OTHER PUBLICATIONS

Korean Office Action mailed Dec. 9, 2009 together with an English translation thereof.

* cited by examiner

Wedge angle switch (5), can be combined here in 4 steps for 16 different wedge angles

DISC BRAKE WITH A SELF-ENERGIZING ELECTRIC MOTOR ACTUATOR

BACKGROUND AND SUMMARY OF THE INVENTION

The invention relates to a disc brake with an actuator, which acts on a brake application device for applying at least one brake pad in the direction of a brake disc, the brake application device having a brake-internal hydraulic arrangement and being configured, to have a self-energizing design.

Disc brakes with actuators, such as an electric motor actuator, which act on a brake application device, for example a rotary lever having pressure pieces arranged behind it, are known in a very wide range of embodiments. It is also known to configure the disc brakes in the self-energizing design, in order for it to be possible to give the electric motor smaller drive dimensions. DE 101 05 752 A1 and DE 103 24 424 A1 disclose examples of brakes of this type. The known concepts, however, cannot practically operate. There is, therefore, the requirement for new solution approaches.

The maximum required motor output for the electric brake application and the corresponding gear mechanisms for force transmission form a decisive cost factor. The coefficient of friction of the brake pad changes, above all, as a consequence of heating, which plays a particular role, for example, in disc brakes for trucks. The motor output which is required here is considerable and entails additional costs for the provision of the electrical supply.

A disc brake having a brake-internal hydraulic arrangement is known, for example, from U.S. Pat. No. 4,435,021 or DE 195 27 936 A1.

A further disc brake is known from DE 101 05 540 A1, in which an electric motor acts as an actuator on a brake-internal hydraulic arrangement via pistons. However, this disc brake can be controlled or regulated only with relative difficulty with regard to its self-energizing action.

The object of the present invention comprises the elimination of this problem.

The invention provides a disc brake with an actuator which acts on a brake application device for applying at least one brake pad in the direction of a brake disc. The brake application device has a brake-internal hydraulic arrangement and is configured in a self-energizing design. The brake pad is supported on the brake application device at a wedge angle, wherein the hydraulic arrangement has a working unit for switching over the wedge angle, at which the brake pad is supported on the brake application device.

Thus, in a self-energizing brake, the invention makes it possible always to achieve optimum force boosting of a self-energizing brake of this type in a simple way, since the inclination or wedge angle, at which the brake application device acts on the brake pad, is of adjustable configuration during the braking operation. This makes simple and effective wedge angle setting possible even during a braking operation.

The brake boosting effect according to the wedge feeding principle can be used by way of a working unit, which has a preferably hydraulic cylinder having a step piston, while at the same time any desired wedge angle adaptation in precision stages can take place at any time during a braking operation.

The invention therefore has a device for wedge angle setting, which is actuated hydraulically. The working unit for wedge angle adjusting could also be realized in a different way than by a piston, this embodiment being preferred.

Here, a parking brake function can also be integrated, which is based not on hydraulics but on purely mechanical components. The brake can be released again reliably with the aid of the self-energizing hydraulic cylinder, that is to say the working unit.

Wedge angle setting is known per se in self-energizing brakes from DE 1043 24 424 A1. However, a separate gear mechanism arrangement or a separate actuator is required there for the wedge angle setting, in addition to the actual brake application apparatus for applying the disc brake.

The brake-internal hydraulics permit an entire series of embodiments of disc brakes with an electric motor actuator. For example, the electric motor is used as a drive for a pump, which acts on the brake-internal hydraulics. Fluid lines to the brake are therefore no longer required. A cable is sufficient, for example with an energy supply line and a control line. Nevertheless, the advantages of the hydraulic design can therefore also be used in a brake which is driven primarily by the electric motor and is actuated via electrical signals.

Here, according to one development, the brake application device preferably has a lever unit with at least one or more levers, which affords structural and design advantages because the lever arrangement is particularly reliable and secure. According to the prior art, in contrast, self-energizing brakes have been configured as a rule with a wedge arrangement. This variant can be combined with the brake-internal hydraulics which are explained in the above text, but also with a different type of brake application apparatus without hydraulics.

The force transmission of this electrically driven self-energizing brake is preferably performed on a hydraulic basis by use of a brake fluid. Forces and travels can be converted in a simple manner with the aid of the hydraulic fluid.

As a result of the use of hydraulics, which is delimited spatially to the brake, the accumulation of water in the brake fluid can be prevented largely with the avoidance of flexible brake linings and expansion containers made from plastic, which increases the service life significantly.

In one preferred embodiment, the hydraulic cylinders are double-action, the working unit being connected hydraulically between their first pressure connections and the gear pump being connected hydraulically between their second pressure connections. A different application of the hydraulic cylinders can therefore be achieved by means of this arrangement and by means of the working unit, which even affords the advantage that this application is coupled with wedge angle setting, which can also be set during the braking operation.

In one embodiment, the operative connection of the hydraulic cylinders is configured with supporting levers, which results in an advantageous simple construction with small dimensions. Here, it is advantageous in an alternative embodiment that the supporting levers are operatively connected to the hydraulic cylinders via power boosting levers.

A further embodiment is particularly advantageous, in which the supporting levers are operatively connected by way of, in each case, one end to the brake linings via a tilting apparatus, the tilting apparatus being connected in an articulated manner to the supporting levers and the brake lining. This advantageously makes the function of a mechanical parking brake possible.

It is advantageous in another embodiment that the brake lining is provided with a parallel guide device.

There is provision according to one preferred embodiment for levers, in particular supporting levers, to be provided which have a V-shaped design. The supporting levers preferably are mounted pivotably in each case by way of one end on the brake lining and in each case by way of two ends on the adjusting lever, which makes it possible to use this apparatus for forward and reverse traveling in a vehicle. An inverted arrangement is likewise contemplated.

Moreover, it is advantageous here that, in the direction of the ends which are mounted in the brake pad, the supporting levers are of widened configuration in the direction of the pivoting axis of the ends, which ensures advantageously uniform brake pad guidance and wear in the transverse direction. An inverted arrangement with the wider ends toward the brake pad is also contemplated.

There is provision according to a further preferred embodiment for the adjusting lever to be mounted pivotably on the counterbearing in the region of the bearing points of the in each case, two ends of the supporting levers on its side which lies opposite the bearing points, the pivoting axes of the bearing points extending parallel to the pivoting axes of the bearing points of the supporting lever and being arranged in the transverse direction of the supporting levers offset with respect to the pivoting axes of the bearing points of the supporting levers. The advantage which results from this consists in the fact that this apparatus additionally makes the function of a mechanical parking brake realizable. To this end, it is expedient that the gear pump is configured such that it can be connected hydraulically to the hydraulic cylinder for the function of the parking brake, application and release of the parking brake taking place electrohydraulically but fixing being mechanical.

In a further embodiment, a wedge-like wear tracking device is provided between the adjusting lever and its counterbearing, a spring being provided for restoring the brake pad and for holding together the brake pad, the supporting lever and the adjusting lever, which makes a simple space saving design possible.

It is preferred that the working unit has a step piston having a low pressure connection, a high pressure connection and a supply pressure connection, the step piston having a reduction in its piston diameters, which reduction is arranged in a step-like manner, and the area contents of the individual steps of the working unit preferably being configured in a ratio of 2:1. Furthermore, there is provision here for it to be possible for the individual steps of the working unit to be connected to the supply pressure connection or the high pressure connection. This results in the advantage, when this working unit is used according to the invention, that the step piston which can be switched over can perform an adaptation which acts as switchover of the wedge angle at any instant during a braking operation. In the case of three steps which can be combined, eight different angular settings result, for example.

There is provision in a further embodiment for the apparatus to have pressure sensors for detecting the brake application force and braking force, and the brake lining wear.

Moreover, the apparatus is equipped with a supply pressure circuit having an expansion vessel and a shutoff valve, the components being situated on the brake and making an advantageously simple hydraulic construction possible.

Finally, it is advantageous if the disc brake has a control device, in particular a control unit which is either arranged directly on the brake or is designed as another control device of a superordinate control system of the vehicle, which is designed to control or regulate at least the wedge angle setting during a braking operation, the regulation preferably taking place as a function of the brake application force and the currently set wedge angle.

The invention provides an advantageous disc brake with an actuator which acts on a brake application device for applying at least one brake pad in the direction of a brake disc, the brake application device having a lever arrangement with at least one or more levers, the at least one lever being of a V-shaped configuration. A simple and uncomplicated lever design is provided in this way.

BRIEF DESCRIPTION OF THE DRAWINGS

In the following text, the invention will be explained in greater detail using the exemplary embodiments which are specified in the diagrammatic figures of the drawing, in which.

Identical designations are used for parts having an identical or similar function.

DETAILED DESCRIPTION OF THE DRAWINGS

Figure 1:
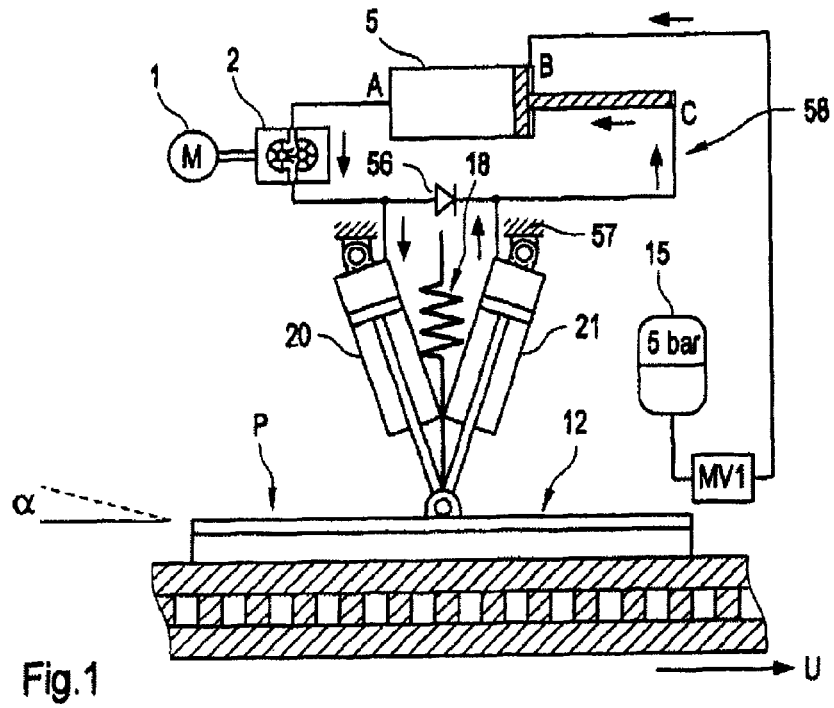
FIG. 1 shows a first exemplary embodiment of the apparatus according to the invention.

FIG. 1 provides an outline sketch to illustrate the invention, which can also be configured as an independent exemplary embodiment.

An electric motor 1 acts as an actuator on a brake application device with brake-internal hydraulics. This is realized by the electric motor driving an impeller, or gear pump 2, which is connected into a hydraulic circuit 58 which acts on hydraulic pistons of hydraulic cylinders 20, 21 which are articulated on the rear plate of a brake pad. The reaction-side brake pad and the brake caliper are not shown per se: fixed, sliding and pivoting caliper concepts and mixed forms of those concepts are contemplated (all not shown). A nonreturn valve 56 is arranged in the circuit 58 between the connections of the hydraulic cylinders 20, 21.

According to FIG. 1, the two hydraulic cylinders 20, 21 are oriented in a V-shape with respect to one another and are, here, connected in an articulated manner to the brake pad 12 at a common fastening point by way of example. They are supported by way of their other ends on a fixed counterbearing (brake caliper 57; not shown in further detail). The latter also forms a fastening point for a spring 18, which moves the brake pad 12 away from a brake disc 13 to a defined air play, as is known.

The hydraulic cylinders 20, 21 are connected by way of their pressure connections to the hydraulic circuit 58, into which a gear pump 2 is connected which is driven by the electric motor 1. Since both hydraulic cylinders 20, 21 are connected to the hydraulic circuit and are first of all loaded at the same time with the same pressure, a horizontal displacement of the brake pad 12 toward the brake disc 13 occurs first of all for small movements of their pistons. However, feedback to the hydraulic circuit 58 is also achieved here by the selected arrangement after the contact of the brake pad 12 on the brake disc 13, which feedback leads to the initial parallel connection of the cylinders also becoming a series connection on account of the nonreturn valve 56.

In the hydraulic and geometric arrangement which is shown in FIG. 1 of the hydraulic cylinders 20, 21, which arrangement leads to the initial parallel connection becoming a series connection to a working unit 5 after contact of the brake pad 12, the construction of the working unit 5 is described in detail further below. A movement component of the brake pad 12 in the circumferential direction of the brake disc also results after the contact of the brake pad 12 on the brake disc 13, if the brake disc 13 rotates in the direction which is indicated by the arrow. The wedge feed principle with self-energizing of the braking force is realized in this way (the wedge angle α is shown diagrammatically on the left in FIG. 1).

The wedge action of the counterbearing and the brake pad 12 is not realized, however, by way of the wedge per se, but in a completely different manner by supports which are either connected to a point of the brake pad 12, as in FIG. 1, or are preferably connected to offset points of the pad.

If the brake pad 12 (FIG. 1) is displaced in the direction of the arrow P after the first movement of the pump 2 and comes into contact with the brake pad 12 and the latter comes into contact with the brake Disc 13, the second hydraulic cylinder 21 is compressed to a more pronounced extent than the first hydraulic cylinder 20.

On account of the hydraulic series connection which now occurs in effect, the pressure which is generated in the second hydraulic cylinder 21 is transmitted to the high pressure connection C of the working unit 5 (cylinder), the piston of which transmits a different pressure on a low pressure side A to the first hydraulic cylinder 20 via the gear pump 2, which is driven by the electric motor 1. As a result of this different pressure, the first hydraulic cylinder 20 is extended to a lesser extent by a different amount, so that the movement of the brake pad 12 obliquely to the right and downward results, which corresponds to a defined wedge angle.

The pressure connections of the hydraulic cylinders 20, 21 are connected via the directional valve 56, for example a nonreturn valve, as a result of which a directed flow in the hydraulic circuit is made possible which is required in this exemplary hydraulic circuit. This above-described operation can be controlled by the gear pump 2 via the electric motor 1, as a result of which the braking operation is also initiated at a low power output of the electric motor 1, in order then to generate the braking force by the self-energizing action.

The brake boosting effect according to the wedge feed principle and the adjustability of the wedge angle are achieved by way of the working unit 5, which has a step piston 30 (FIG. 3) with a reduction in the piston diameters which is arranged in a steplike manner.

Here, any desired wedge angle adaptation can be performed in precision stages at any point of the braking operation, for example with the aid of a regulating circuit which considers the coefficient of friction and/or other parameters such as the normal force or the like, by the different reduction steps of the working unit 5 being switched on or switched over, which will be explained further below.

A supply circuit is connected to the working unit 5 at a supply circuit connection B. The supply circuit has an expansion vessel 15 for volumetric change as a result of piston extension and wear tracking, and a shutoff valve 14 which serves to fix the rest position when the brake is released.

Figure 3:
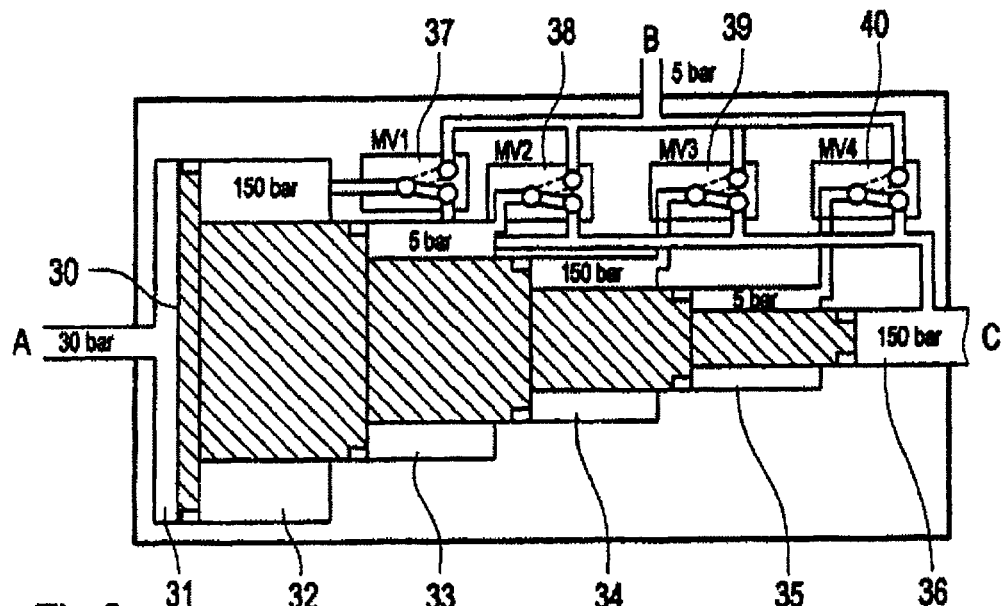
FIG. 3 shows a diagrammatic longitudinal sectional illustration of a working unit.

FIG. 3 shows the working unit 5 with a step piston 30 in a longitudinal section. The low pressure connection A is connected to a low pressure side 31, the supply pressure connection B is connected, in particular, to solenoid valves 37 to 40, and the high pressure connection C is connected to a high pressure side 36. In this example, the step piston 30 has four working chambers or steps 32, 33, 34, 35 with, in each case, piston diameters of different sizes. The surface contents of the individual chambers or steps are configured in each case in the ratio of 2:1. Thus, for example, the surface area of the step 34 is half as large as the surface area of the step 33. The surface area of the step 35 is also only half as large as the surface area of the step 34. Each of these steps 33 to 35 can be connected individually as desired by switching of the solenoid valves 37 to 40 to the supply pressure in the supply circuit at the connection B or to the high pressure side at the connection C. Using the example of this four-step cylinder reduction, the surface area ratio of the piston 30 in the chamber of the low pressure side 31 (connection A) with respect to the overall acting surface area at the connection C can be set in sixteen steps by a corresponding actuation of the solenoid valves 37 to 40. The solenoid or switchover valves 37 to 40 are configured in such a way that there is no connection between the connection B and the connection C even for a short time during switchover.

Figure 4:
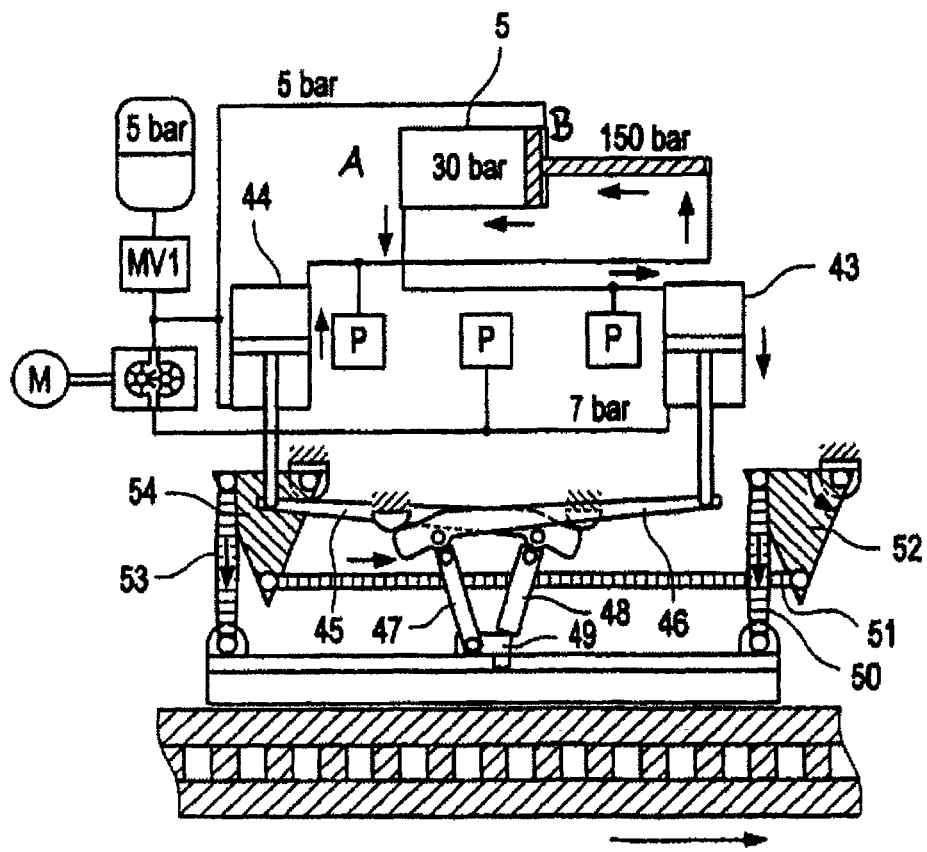
FIG. 4 shows a third exemplary embodiment of the apparatus according to the invention.
Figure 5:
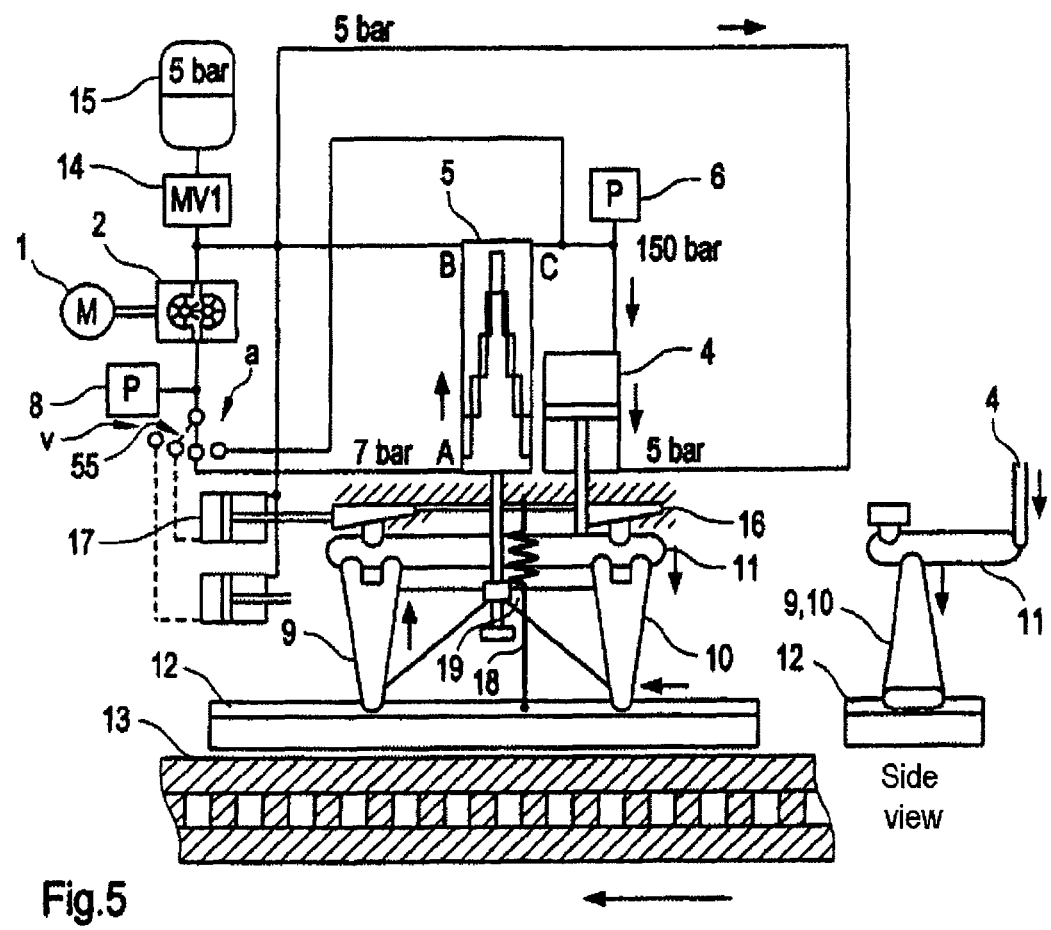
FIG. 5 shows a fourth exemplary embodiment of the apparatus according to the invention.

If this working unit 5 with the step piston 30 is then connected to one or more hydraulic cylinders, as the first exemplary embodiment in FIG. 1 or further examples in FIGS. 3 to 5 show, an adaptation which acts as switchover of the wedge angle can be performed at any time during a braking operation, in order that the self-energizing action of the brake can always be maintained at the optimum performance point.

The accumulation of water in the hydraulic brake fluid can be prevented largely by the spatially delimited use of hydraulics directly on the brake while avoiding flexible brake lines and expansion containers made from plastic, which thus extends the service life of the apparatus.

Figure 2:
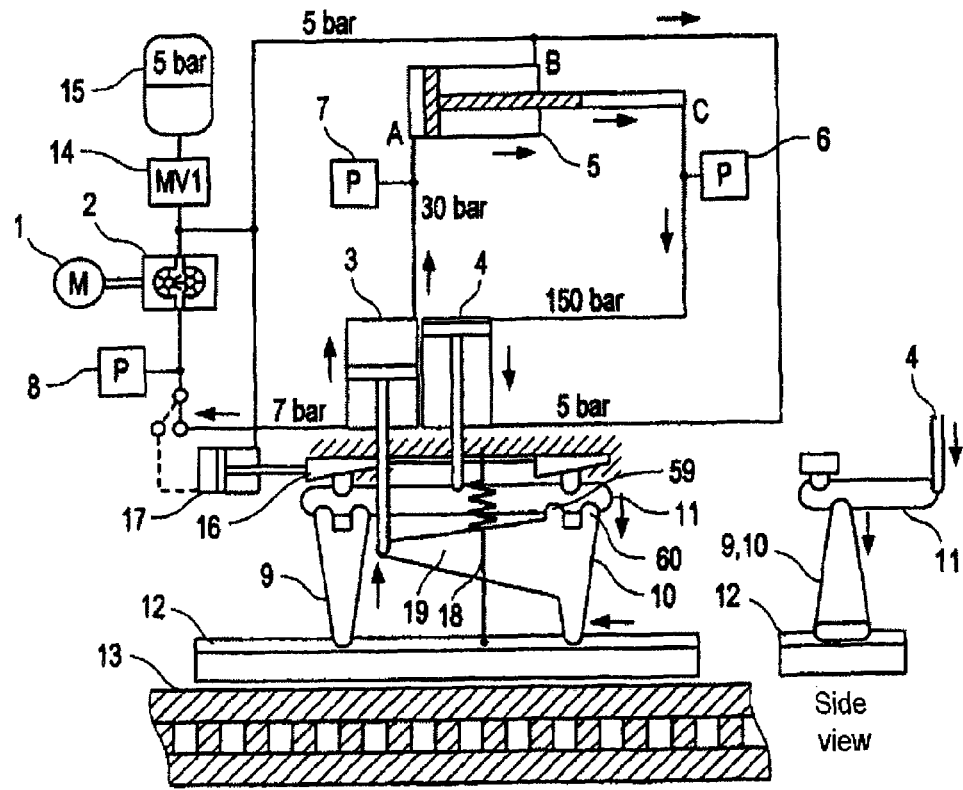
FIG. 2 shows a second exemplary embodiment of the apparatus according to the invention.

FIG. 2 shows a second exemplary embodiment of the apparatus according to the invention having a supplementary parking brake function.

Here, as in FIG. 1, two hydraulic cylinders 3, 4 and the working unit 5 are also used. In this case, however, the hydraulic cylinders 3, 4 are configured as double-action cylinders with two pressure connections. The working unit 5 is connected between the first pressure connections of the hydraulic cylinders 3, 4. The hydraulic line extends from the gear pump 2 to the second pressure connection of the first hydraulic cylinder 3, and the second pressure connection of the second hydraulic cylinder 4 is connected to the supply pressure.

First of all, the parking brake according to this second exemplary embodiment will be described.

Two V-shaped supporting levers 9, 10 are connected pivotably to the brake pad 12 by way of their lower, for example semicylindrical "pointed" ends, these ends being arranged at a spacing. In each case, two upper ends of the V-shaped supporting levers 9, 10 are likewise pivotably connected to an adjusting lever 11, for example by way of in each case two further semicylindrical ends 59, 60, which adjusting lever 11 is supported on a fixed counterbearing via a wear tracking device 16. The ends of the supporting levers 9, 10 are of round configuration, for example, for rolling in correspondingly configured bearing points, with the result that favorable rolling friction takes place during their movements.

The supporting lever 10 has a lever 19, which is connected fixedly to it and is articulated at its free end to the piston of the first hydraulic cylinder 3. Its function will be explained later. The adjusting lever 11 is connected in an articulated manner to the piston of the second hydraulic cylinder 4.

The brake lining 12 is held on the fixed counterbearing by a tension spring 18, which also holds the supporting levers 9, 10, the adjusting lever 11 and the wear tracking device 16 together.

As a result of this arrangement of the two V-shaped supporting levers 9, 10, the gear pump 2 can feed directly into the connection A of the working unit 5 for activation of the parking brake. The gear pump is connected to the connection A via a switchover valve (not shown). The step piston 30 of the working unit 5 boosts this hydraulic pressure and guides it via the high pressure connection C into the second hydraulic cylinder 4, with the result that the piston of the latter extends and moves the supporting levers 9, 10 downward via the adjusting lever 11, as a result of which the brake pad 12 is pressed against the brake disc 13. Here, the adjusting lever 11 is moved toward the brake disc 13 until the lower dead center is passed on the lever stepdown side of the supporting levers 9, 10 (side view in FIG. 2). The brake therefore remains applied to its maximum extent as a parking brake even without the actuating force of the second hydraulic cylinder 4.

If the movement of the brake disc 13, for example to the left, then takes place, for example on a slope during parking of the vehicle, the two supporting levers 9, 10 are raised in each case by way of their right-hand upper ends slightly from the adjusting lever. Here, they pivot about the left-hand upper ends. The lever action of the supporting levers 9, 10, which is then oblique, produces a further increase in the brake application force, since the levers produce a clamping wedge action. The angle of the two supporting levers 9, 10 is selected in such a way that the wedge angle α is so acute that the brake is applied further. As a result of the symmetrically V-shaped design of the two supporting levers 9, 10, the parking brake acts equally in both actuating directions or driving directions of the vehicle.

In order to release the parking brake, the piston of the second hydraulic cylinder 4 is moved upward. As a result of the latching moment in the top dead center of the adjusting lever 11, a very high release moment can be achieved, in order to achieve reliable release even with pronounced wedge application. The pressure boosting of the working unit 5 can optionally be used to release the brake at a high hydraulic pressure by way of the second hydraulic cylinder 4.

During a service braking operation, the above-described pivoting of the V-shaped supporting levers 9, 10 about their upper ends brings about a situation where the function of automatically feeding wedge force boosting is achieved even without actuation of the adjusting lever 11, that is to say of the second hydraulic cylinder 4. Thus, for example in the case of a horizontal displacement of the brake lining 12 by, for example, 10 mm, a vertical brake application travel of, for example, 2 mm can be achieved by the oblique support of the supporting levers 9, 10. The adjusting lever 11 only has to compensate for the height difference between a maximum acute and a maximum obtuse wedge angle as a result. This can be used to increase the lever step-up ratio. The forces which act on the hydraulic cylinders 3, 4 are therefore reduced.

An explanation of the wedge angle setting and the function of the first hydraulic cylinder 3 now follows.

The horizontal movement of the brake pad 12 can be deflected to a vertical movement with the aid of the lever 19 on the supporting lever 10, since the supporting lever 10 pivots alternately about its upper left-hand or right-hand end depending on the direction of travel. This triggers alternately a vertical compression or tensile movement on the piston of the first hydraulic cylinder 3 and a corresponding pressure change of the latter in the connected hydraulic circuit. Given corresponding dimensions, the piston lower surface, which is reduced by the piston rod diameter and therefore the reduced tensile force, can be compensated for by the longer lever arm of the lever 19, since the supporting levers 9, 10 pivot in this case about the right-hand upper bearing point and the lever length of the lever 19 is therefore lengthened.

As a result of the working unit 5, as a function of the horizontal displacement travel of the brake pad 12, which horizontal displacement travel has been converted via the first hydraulic cylinder 3 in the manner described above first into a vertical movement and then into a pressure change, an adjustable brake application movement can be brought about by the second hydraulic cylinder 4, which is connected in series hydraulically to the high pressure connections C of the working unit 5. This corresponds to an adjustable wedge angle.

The adjustable wedge angle ensures that the braking apparatus is always a very high self-energizing range. The gear pump 2 can therefore control this balance state with comparatively low expenditure of force (the electric motor 1 with a low electrical power consumption). To this end, for example, the hydraulic volumetric flow is guided through the first hydraulic cylinder 3 by the gear pump 2, with the result that its piston can be adjusted only as a function of the movement of the electric motor 1.

Given an overall vertical brake application range of 4 mm, 11.5 mm of horizontal movement of the brake pad can therefore be produced by the wedge action of the supporting levers 9, 10, with the result that only 2.5 mm of vertical adjusting travel is still produced via the second hydraulic cylinder 4 and the adjusting lever 11.

The friction point at the beginning of the braking operation can be detected with high resolution using a pressure sensor 7 at the low pressure connection A of the working unit 5. Correspondingly, the friction point can always be maintained at its optimum working point with the aid of the wear tracking device 16.

If the wear of the brake pad 12 is adjusted with the aid of a hydraulic cylinder 17 and the wedge-shaped wear tracking device 16 as shown in FIG. 3, the absolute lining wear can be measured by pressure measurement of the pressure sensor 7 or a pressure sensor 8 at the outlet of the gear pump 2. The absolute system pressure drops as a function of the wear travel as a result of the expansion vessel 15. A pressure drop is likewise registered if brake fluid is lost, with the result that a service or repair visit can be indicated via a vehicle-internal report system in both cases.

FIG. 4 shows a third exemplary embodiment of the apparatus according to the invention. Here, the hydraulic circuit is configured in a similar manner to that according to FIG. 2. A wear tracking device 16, 17 is not shown in the drawing but is also possible. Supporting levers 47, 48 are mechanically operatively connected to the first and second hydraulic cylinder 43, 44 in each case via power boosting levers 45, 46. The power-boosting levers 45, 46 roll on fixed counterbearings, as a result of which the corresponding coefficients of friction are kept low. The supporting lever 47 serves for wedge angle setting and is driven by the first hydraulic cylinder 43, and the supporting lever 48 serves for introducing the brake application force and is driven by the second hydraulic cylinder 44.

The supporting levers 47, 48 are connected to the brake pad 12 via a tilting apparatus 49. The tilting apparatus 49 serves to release the parking brake reliably. The brake pad 12 is provided with a parallel guide, which includes parallel guide supporting levers 50, 53, force deflection elements 52, 54 and a longitudinal connection 51.

FIG. 5 shows a fourth exemplary embodiment of the apparatus according to the invention. The mechanical construction corresponds substantially to the second exemplary embodiment according to FIG. 2, both supporting levers 9, 10 having a fixedly attached lever 19 and being of symmetrical configuration, however. The free ends of the lever 19 interact with a piston rod of the working unit 5, which forms the first hydraulic cylinder here. The end of the piston rod is configured in such a way that the free ends of the levers 19 can be displaced by a defined vertical travel before the vertical movement of the piston of the working unit 5 is initiated via two stops.

The second hydraulic cylinder 4 is connected to the high pressure connection C of the working unit 5, as in FIG. 3, the low pressure connection A of the working unit 5 being connected hydraulically to the gear pump 2.

Furthermore, a device is shown for switching over 55 the operating mode at the outlet of the gear pump 2. In one position a, the parking brake is engaged by the gear pump 2 acting directly on the second hydraulic cylinder 4. In the other position v, the working unit 5 is connected into the volumetric flow of the gear pump 2. This function is described above in the second exemplary embodiment according to FIG. 3. In the positions v, hydraulic cylinders 17 (wear tracking device optionally possible on both sides) of the wear tracking device 16 of the brake pad 12 are actuated. The switchover 55 can take place, for example, automatically or semiautomatically by use of a solenoid valve.

The following properties and advantages therefore result individually or in combination:

- Braking force generation according to the wedge feeding principle, and electric motor drive;
- Hydraulic force transmission by use of brake fluid;
- Fixed caliper having adaptive pad wear tracking on both sides;
- Wear tracking, also for the pad on the rear side, without additional motor;
- Long service intervals for brake fluid changes (five to ten years as a result of the prevention of water absorption);
- Service intervals of the brake fluid together with pad change possible;
- Wedge angle adaptation also possible during active braking;
- Four-step switchover makes sixteen different wedge angles possible in the present exemplary embodiment;
- Use of a relatively small electric motor with corresponding power consumption;
- Motor/hydraulic force transfer by gear pump without step-down gear mechanism;
- Simple force measurement by two pressure sensors;
- Direct measurement of the brake application force and the braking force possible;
- Accurate measurement or detection of the engagement point/friction point of the brake pads by differential pressure measurement;
- Measurement of the pad wear without additional wear travel sensors; and
- Function of a hand brake (parking brake) with wedge force self-energizing (self-locking) active in both movement directions of the vehicle.

Although the present invention has been described in the preceding text using preferred exemplary embodiments, it is not restricted thereto but can be modified in many ways.

Thus, for example, a first pressure sensor 6 can serve to detect the brake application force, a second pressure sensor 7 can serve to detect the braking force, and a third pressure sensor 8 can serve to detect the actuating force of the gear pump 2 and the overall braking force on the hydraulic cylinder 3. If the gear pump 2 is not actuated, the third pressure sensor 8 serves to detect the pressure in the expansion vessel 15.

Uniform brake pad guidance and therefore wear in the transverse direction of the brake lining 12 can be made possible by widening of the supporting levers 9, 10 in the region of the brake pad 12 (FIGS. 2 and 5, side view).

The step piston 13 of the working unit 5 can have less than four or else more than four stages.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| Table of Reference Numerals | |
|---|---|
| 1 | Electric motor |
| 2 | Gear pump |
| 3 | First hydraulic cylinder for receiving the brake force |
| 4 | Second hydraulic cylinder for generating the brake application force |
| 5 | Working unit |
| 6 | First pressure sensor |
| 7 | Second pressure sensor |
| 8 | Third pressure sensor |
| 9 | First supporting lever |
| 10 | Second supporting lever |
| 11 | Adjusting lever |
| 12 | Brake pad |
| 13 | Brake disc |
| 14 | Shutoff valve |
| 15 | Expansion vessel |
| 16 | Wear tracking device |
| 17 | Hydraulic cylinder, wear tracking means |
| 18 | Spring |
| 19 | Lever |
| 20 | First hydraulic cylinder for setting the wedge angle |
| 21 | Second hydraulic cylinder for introducing the brake application force |
| 22 | Supporting element |
| 30 | Step piston |
| 31 | Low pressure side |
| 32 . . . 35 | Working chamber |
| 36 | High pressure side |
| 37 . . . 40 | Solenoid valve |
| 43 | First hydraulic cylinder for adjusting the wedge angle |
| 44 | Second hydraulic cylinder for introducing the brake application force |
| 45, 46 | Power boosting lever |
| 47 | Supporting lever for setting the wedge angle |
| 48 | Supporting lever for the brake application force |
| 49 | Tilting apparatus |
| 50, 53 | Parallel guide supporting lever |
| 51 | Longitudinal connection |
| 52, 54 | Force deflection element |
| 55 | Switchover means, operating mode |
| 56 | Directional valve |
| 57 | Brake caliper |
| 58 | Hydraulic circuit |
| 59, 60 | Ends |
| A, B, C | Connections |
| a, n, v | Settings |
| G | Counterbearing |
| MV | Solenoid valve |
| p | Pressure |
| U | Circumferential direction |

The invention claimed is:

1. A disc brake, comprising:
an electric motor actuator;
a brake application device for applying at least one brake pad in a direction of a brake disc, the brake application device being actuated via the actuator electric motor;
wherein
the brake application device comprises a brake-internal hydraulic arrangement operatively configured as a self energizing design;
the brake pad is supported on the brake application device at a wedge angle, the hydraulic arrangement having a working unit for adjusting the wedge angle at which the brake pad is supported on the brake application device;

the hydraulic arrangement has a hydraulic circuit, the working unit for adjusting the wedge angle being connected into the hydraulic circuit;

the working unit comprises a cylinder adjusting the wedge angle, the cylinder being connected into the hydraulic circuit;

the brake application device includes a gear pump coupled to the electric motor actuator and connected into the hydraulic circuit;

the hydraulic arrangement of the brake application device has two hydraulic cylinders with hydraulic pistons which are mechanically operatively connected in each case by way of one of their ends to the brake pad; and the two hydraulic cylinders are oriented in a V-shaped manner with respect to one another and are connected in an articulated manner to the brake lining at a common fastening point.

2. The disc brake as claimed in claim 1, wherein the working unit has a step piston having a low pressure connection, a high pressure connection, and a supply pressure connection.

3. The disc brake as claimed in claim 2, wherein the step piston has a reduction in its piston diameters, which reduction is arranged in a step-like manner.

4. The disc brake as claimed in claim 3, wherein the individual steps of the working unit are configured with a volumetric area in a ratio of 2:1.

5. The disc brake as claimed in claim 4, wherein the individual steps of the working unit are connectable to the supply pressure connection or the high pressure connection.

6. The disc brake as claimed in claim 1, further comprising pressure sensors for detecting a brake application force and braking force, and the brake pad wear.

7. The disc brake as claimed in claim 6, further comprising a supply pressure circuit having an expansion vessel and a shutoff valve.

8. The disc brake as claimed in claim 1, further comprising a control unit arranged directly on the brake and designed to control or regulate at least the wedge angle setting during a braking operation.

* * * * *